(12) United States Patent
Murakami et al.

(10) Patent No.: US 12,187,100 B2
(45) Date of Patent: Jan. 7, 2025

(54) INFORMATION PROCESSING DEVICE, INFORMATION PROCESSING METHOD, PROGRAM, AND VEHICLE

(71) Applicant: TOYOTA JIDOSHA KABUSHIKI KAISHA, Toyota (JP)

(72) Inventors: Kunihiro Murakami, Toyota (JP); Hiroyasu Hadano, Toyota (JP); Takaaki Inokuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 17/543,005

(22) Filed: Dec. 6, 2021

(65) Prior Publication Data

US 2022/0242198 A1 Aug. 4, 2022

(30) Foreign Application Priority Data

Feb. 4, 2021 (JP) .................. 2021-016610

(51) Int. Cl.
*B60H 1/22* (2006.01)
(52) U.S. Cl.
CPC ..... *B60H 1/2218* (2013.01); *B60H 2001/224* (2013.01); *B60H 2001/2253* (2013.01)

(58) Field of Classification Search
CPC ............ B60H 1/2218; B60H 2001/224; B60H 2001/2253; B60H 1/00428; B60H 1/22; B60H 2001/2234; B60N 2/5685; B60S 1/026; B62D 1/065
See application file for complete search history.

(56) References Cited

U.S. PATENT DOCUMENTS

| 2018/0222281 A1 | 8/2018 | Tamane et al. |
| 2020/0122549 A1 | 4/2020 | Seki et al. |
| 2020/0164716 A1* | 5/2020 | Fellner ............... B60H 1/00007 |

FOREIGN PATENT DOCUMENTS

| JP | 2006-347295 A | 12/2006 |
| JP | 2009-107548 A | 5/2009 |
| JP | 2011-255686 A | 12/2011 |
| JP | 2018-122837 A | 8/2018 |
| JP | 2020-66301 A | 4/2020 |

* cited by examiner

*Primary Examiner* — Yuen Wong
(74) *Attorney, Agent, or Firm* — Sughrue Mion, PLLC

(57) ABSTRACT

An information processing device that controls a vehicle including a plurality of heating devices. The information processing device executes acquiring an air conditioning request transmitted from a user terminal, and selecting a heating device to be operated, among the heating devices in which an operation is specified by the air conditioning request, based on a remaining battery amount of the vehicle.

12 Claims, 10 Drawing Sheets

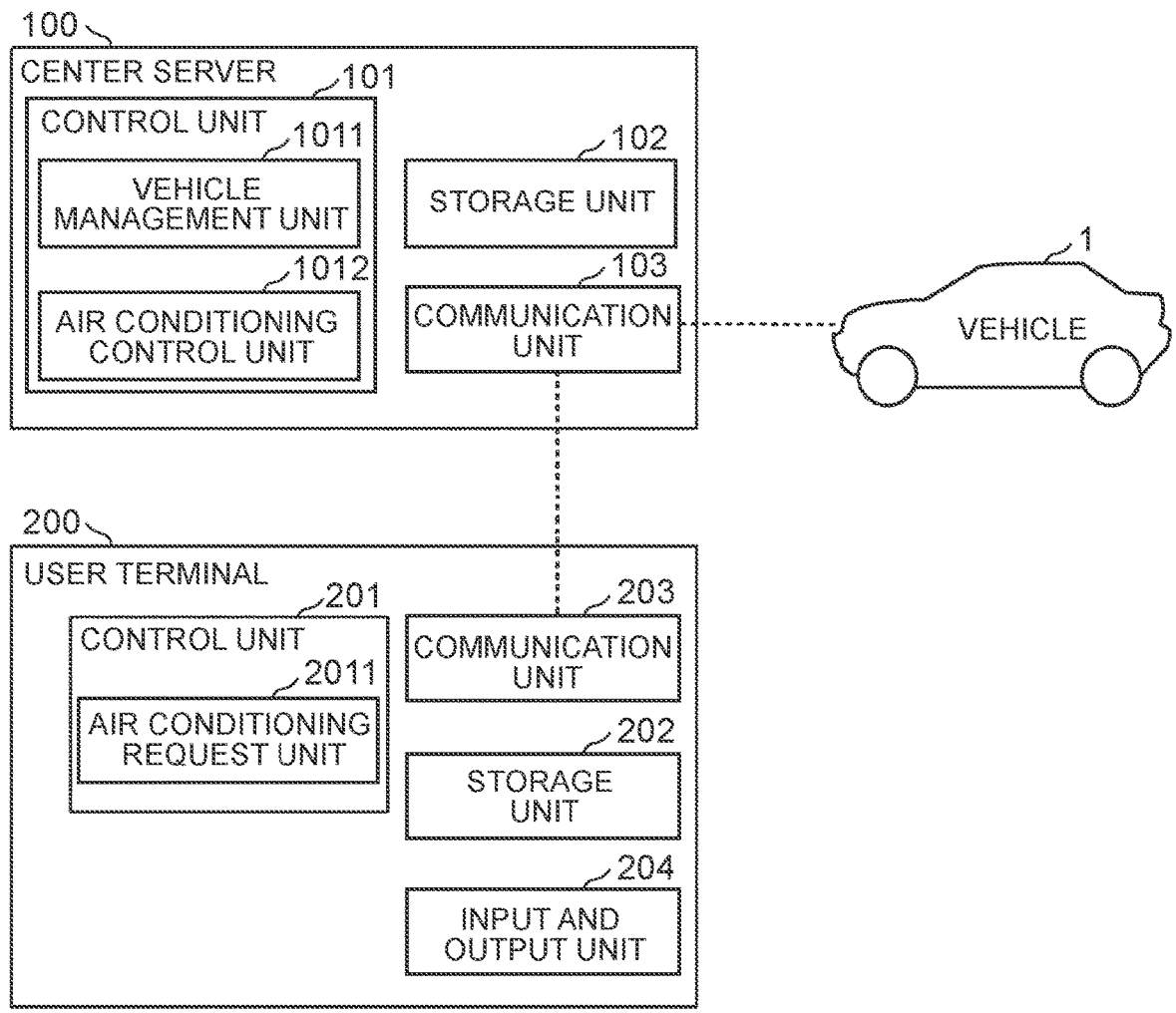

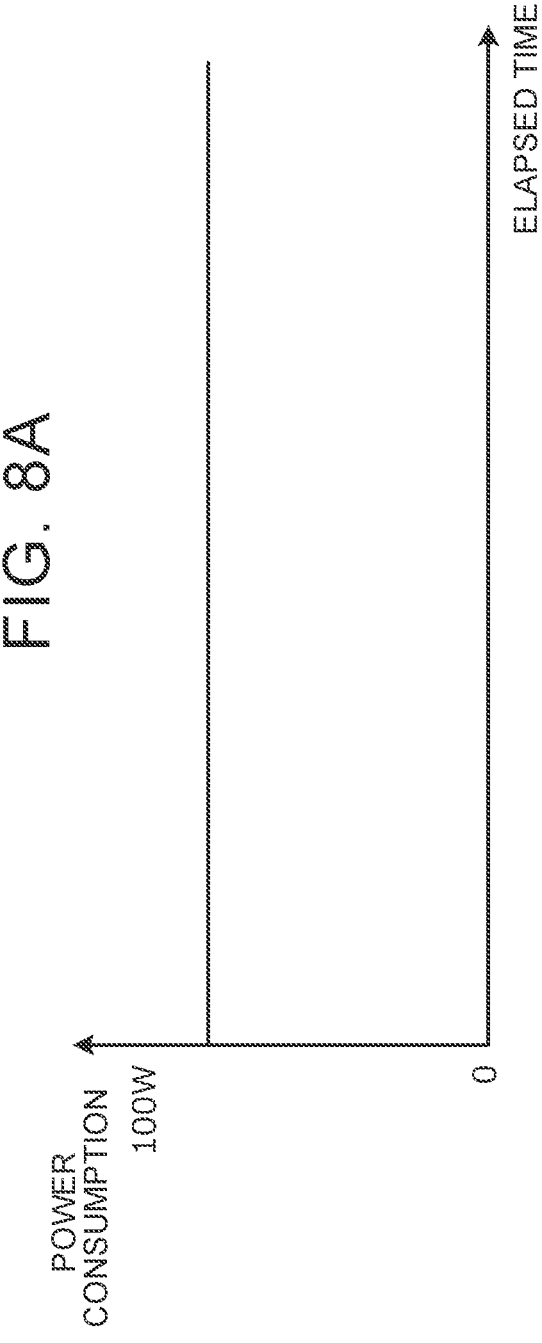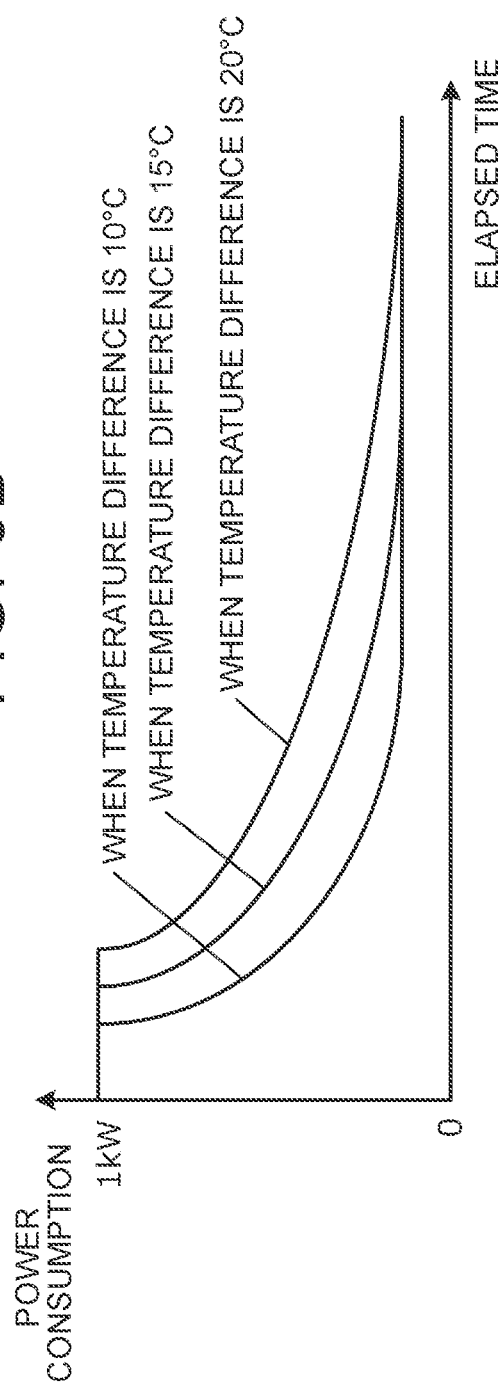

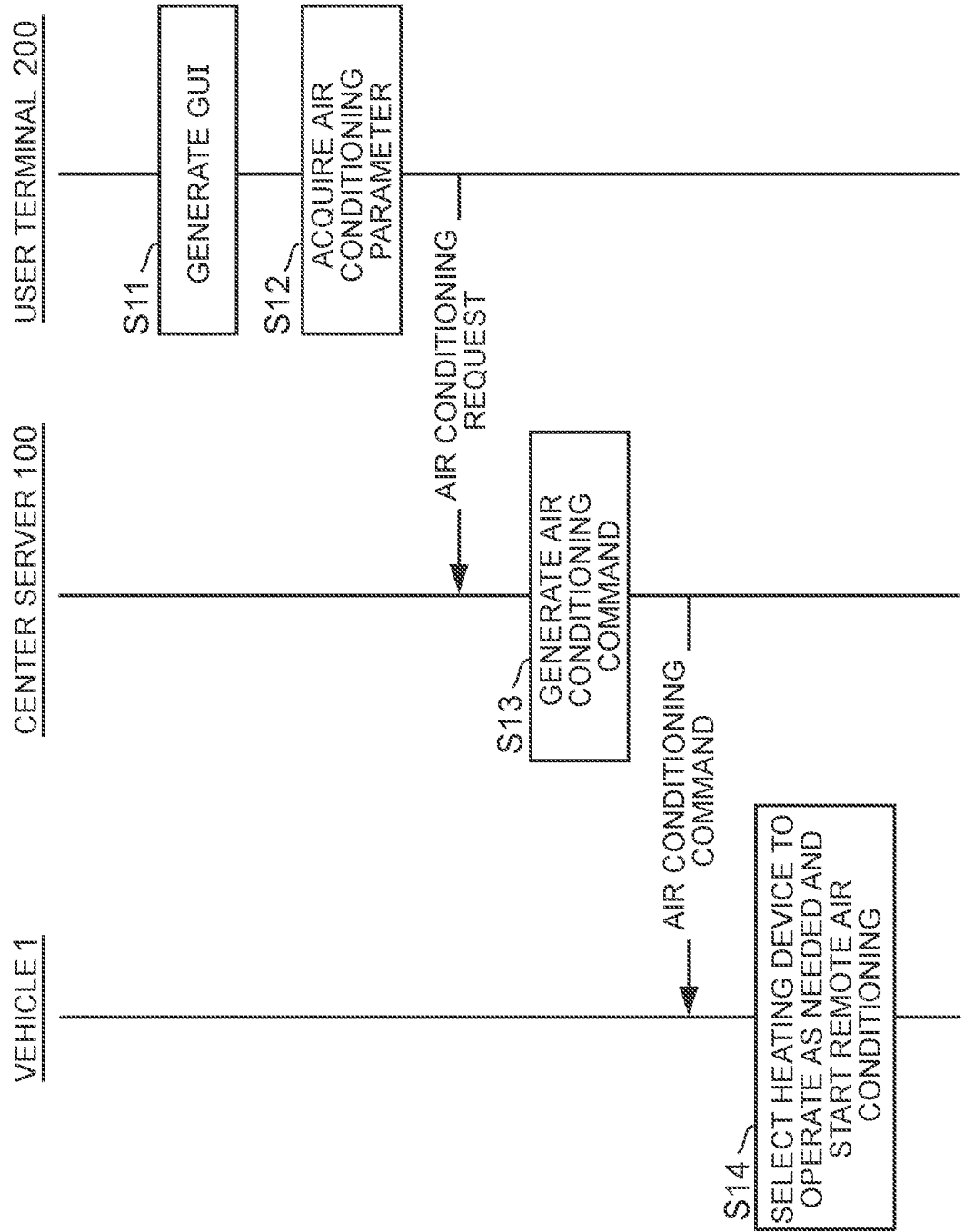

INFORMATION PROCESSING DEVICE, INFORMATION PROCESSING METHOD, PROGRAM, AND VEHICLE

CROSS-REFERENCE TO RELATED APPLICATION

This application claims priority to Japanese Patent Application No. 2021-016610 filed on Feb. 4, 2021, incorporated herein by reference in its entirety.

BACKGROUND

1. Technical Field

The present disclosure relates to air conditioning control of a vehicle.

2. Description of Related Art

There is a system for remotely controlling an air conditioning of a vehicle (car air conditioning). For example, Japanese Unexamined Patent Application Publication No. 2018-122837 (JP 2018-122837 A) discloses a remote air conditioning system that starts air conditioning of a vehicle based on a start request transmitted from a terminal and operates a defroster when it is determined that it is necessary to remove frost on the window.

SUMMARY

An object of the present disclosure is to improve the convenience of remote air conditioning.

The first aspect of the present disclosure is an information processing device that controls a vehicle including a plurality of heating devices. Specifically, the information processing device includes: a control unit that executes acquiring an air conditioning request transmitted from a user terminal; and selecting a heating device to be operated among the heating devices in which operations are specified by the air conditioning request, based on a remaining battery amount of the vehicle.

A second aspect of the present disclosure is an information processing method that controls a vehicle including a plurality of heating devices. Specifically, the information processing method includes: a step of acquiring an air conditioning request transmitted from a user terminal; and a step of selecting a heating device to be operated among the heating devices in which operations are specified by the air conditioning request, based on a remaining battery amount of the vehicle.

A third aspect of the present disclosure is a vehicle including: a plurality of heating devices; a driving battery; and a control unit that selects a heating device to be operated among the heating devices in which operations are specified by an air conditioning request transmitted from a user terminal, based on a remaining amount of the driving battery of the vehicle.

Further, another aspect provides a program for causing a computer to execute the above information processing method, or a computer-readable storage medium in which the program is non-transitorily stored.

According to the present disclosure, the convenience of remote air conditioning can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a block diagram showing components included in a center server and a user terminal;

FIG. 5 is an example of the air conditioning parameter generated by the user terminal;

FIG. 8A is a diagram illustrating power data stored in the air conditioning ECU;

FIG. 8B is a diagram illustrating power data stored in the air conditioning ECU;

FIG. 9 is a flow diagram of data transmitted and received between components of the vehicle system;

DETAILED DESCRIPTION OF EMBODIMENTS

Figure 1:
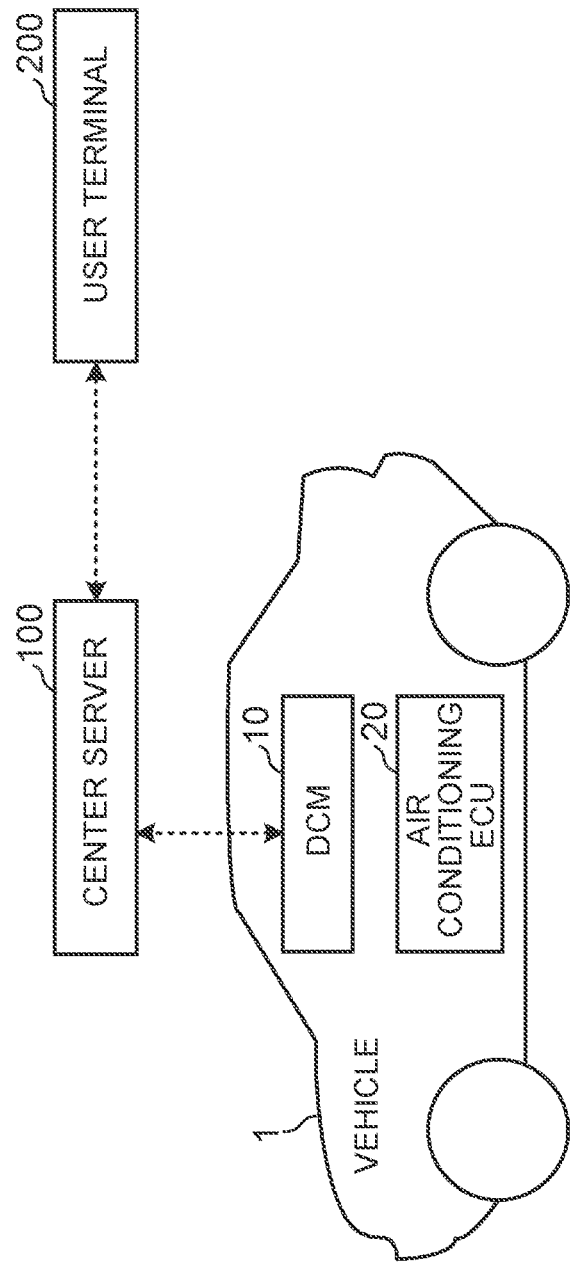
FIG. 1 is a system configuration diagram of a vehicle system according to an embodiment.

One aspect of the present disclosure is an information processing device that controls a vehicle having a plurality of heating devices.

Specifically, the information processing device includes: a control unit that executes acquiring an air conditioning request transmitted from a user terminal; and selecting a heating device to be operated among the heating devices in which operations are specified by the air conditioning request, based on a remaining battery amount of the vehicle.

Vehicles having a heating device (hereinafter referred to as a heating device) operated by electricity, such as a heat pump type car air conditioner, a seat heater, and a steering wheel heater, are known.

Whether remote air conditioning can be performed by these devices depends on the remaining battery amount of the vehicle. For example, when the remaining battery amount of the vehicle is less than a predetermined value, a general vehicle control device performs control that makes the operation of remote air conditioning uniformly impossible.

In contrast, power consumption may be suppressed by limiting the devices to be operated among the plurality of heating devices possessed by the vehicle. However, in a vehicle according to the prior art, it is not possible to selectively operate an operable heating device in accordance with the remaining battery amount.

In order to deal with this, in the information processing device according to the present disclosure, among the heating devices in which the operation is specified by the user, the heating device to be actually operated is selected based on the remaining battery amount of the vehicle. Although the operation of the air conditioner is not possible, it is possible to operate defrosting of a front window, and it is possible to operate only the minimum necessary heating device.

Further, the information processing device may be characterized so as to further include a storage unit that stores data related to power consumption for each of the plurality of heating devices included in the vehicle.

By using such data, it is possible to identify the heating device that can be operated under conditions where the amount of power is limited.

Further, the storage unit may be characterized so as to store data on the transition of power consumption when each of the plurality of heating devices is consecutively operated.

Further, the storage unit may be characterized so as to store data on the transition of power consumption when each of the plurality of heating devices is consecutively operated under a predetermined temperature condition.

The power consumption of a car air conditioner is not constant. Therefore, by using the data on the transition of power consumption, it is possible to obtain the total amount of power consumed when remote air conditioning is performed.

Further, the air conditioning request may be characterized so as to include designation of a condition for terminating the operation of the heating device, and the control unit calculates the power consumption amount required to satisfy the condition.

The conditions are, for example, the elapsed time and the room temperature. As a result, since it is possible to obtain the time until the operation of the heating device is completed, the required power consumption amount can be calculated accurately.

Further, the control unit may be characterized in that the selection is made based on the remaining battery amount and the calculated power consumption amount.

For example, the combination of the heating devices to be operated may be determined so that the remaining battery amount after the operation of the heating devices are completed does not fall below a predetermined value.

Further, the control unit may be characterized in that the selection is made based on the priority set for each of the plurality of heating devices.

The priority may be determined based on the user's preference or may be determined based on safety (for example, prioritize defrosting of the front window to ensure visibility).

Further, the control unit may be characterized so as to notify a user when the operation of at least one of the specified heating devices is restricted as a result of the selection.

The notification can be output by, for example, a mobile terminal owned by the user.

Another aspect of the present disclosure is a vehicle including a plurality of heating devices, a driving battery, and the above-mentioned information processing device.

Hereinafter, embodiments of the present disclosure will be described with reference to the drawings. The configurations of the following embodiments are illustrative, and the present disclosure is not limited to the configurations of the embodiments.

First Embodiment

An outline of a vehicle system according to a first embodiment will be described with reference to FIG. 1. The vehicle system according to the present embodiment includes a vehicle 1, a center server 100, and a user terminal 200.

The vehicle 1 is a connected car provided with a communication function. The vehicle 1 includes a data communication module (DCM) 10 that is a communication module and an air conditioning electronic control unit (ECU) 20 that is an in-vehicle computer that manages a plurality of heating devices. The vehicle 1 can operate a heating device (air conditioner, heater, etc.) based on the data received from the center server 100. Operating the heating device in advance without starting an engine before a user boards the vehicle is called "remote air conditioning".

The center server 100 is a server device that manages the vehicle 1. The center server 100 may manage a plurality of the vehicles 1. The center server 100 commands the vehicle 1 to operate the remote air conditioning based on a request transmitted from the user terminal 200.

The user terminal 200 is a mobile terminal owned by the user of the vehicle 1. The user terminal 200 is configured to be able to execute an application program for performing remote air conditioning of the vehicle. The user terminal 200 generates a request for operating the air conditioning of the vehicle 1 (hereinafter referred to as an air conditioning request) based on the content of an input made by the user on the application program, and transmits the request to the center server 100.

Next, components of the system will be described in detail.

Figure 2:
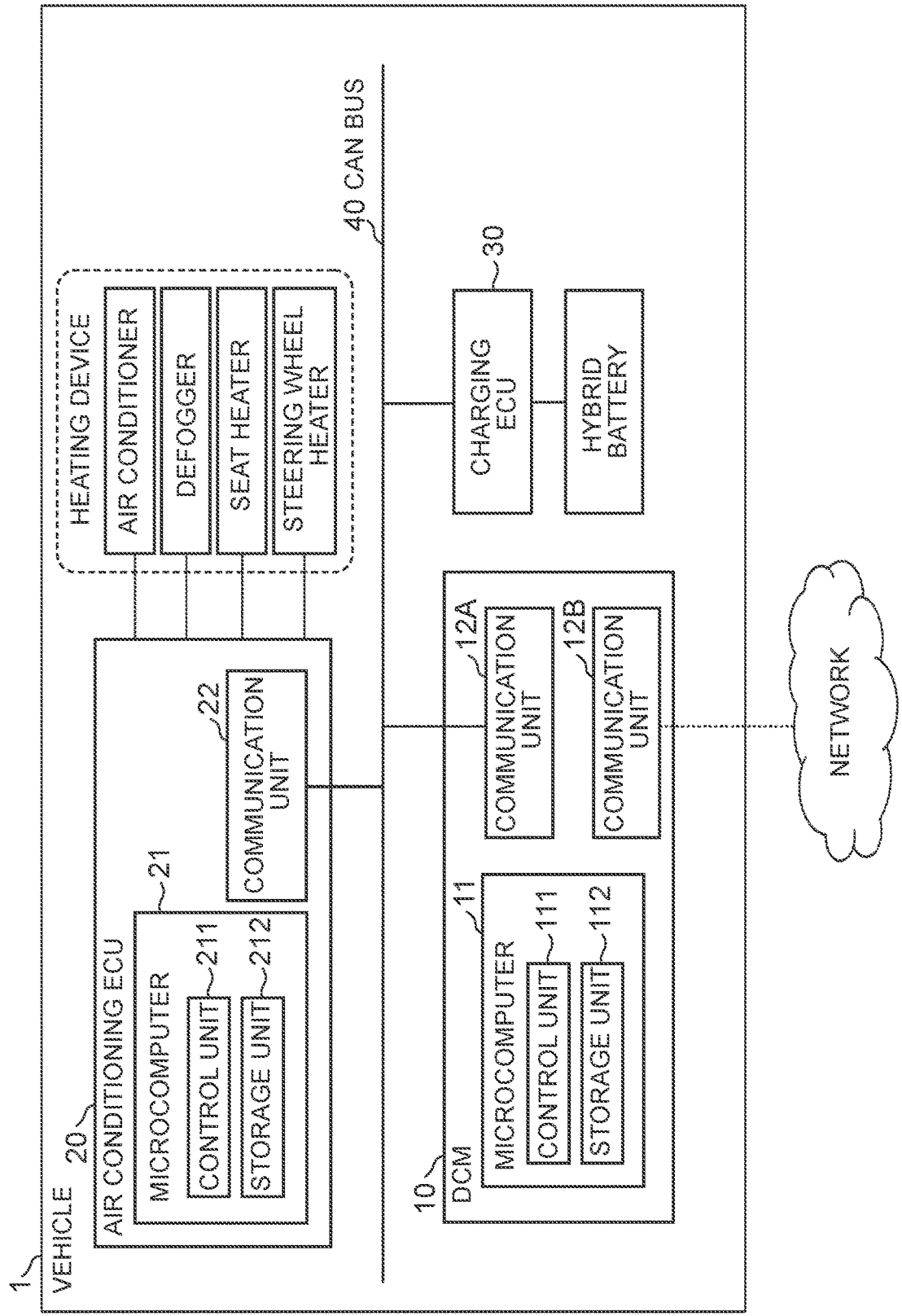
FIG. 2 is a block diagram showing components included in a vehicle.

FIG. 2 is a block diagram schematically showing an example of the configuration of the vehicle 1 shown in FIG. 1. The vehicle 1 includes a DCM 10, an air conditioning ECU 20, a charging ECU 30, and a plurality of heating devices. These components are connected to each other by a controller area network (CAN) bus 40. Note that, in the present embodiment, the air conditioning ECU and the charging ECU are exemplified as an electronic control unit (ECU) mounted on the vehicle 1. However, the vehicle 1 may be equipped with an ECU having jurisdiction over other components, such as an engine ECU, a body ECU, and a powertrain ECU.

The DCM 10 is an interface unit that connects an in-vehicle network and an external communication network of the vehicle 1. Hereinafter, the external communication network of the vehicle 1 is simply referred to as a network or an external network. Examples of the external network include a wide area network such as the Internet.

The DCM 10 includes a microcomputer 11, a communication unit 12A that is an interface for communicating with the CAN bus 40, and a communication unit 12B that is an interface for communicating with an external network.

The microcomputer 11 can be configured as a microcomputer provided with a processor such as a central processing unit (CPU) or a graphics processing unit (GPU), a main storage device such as a random access memory (RAM) or a read-only memory (ROM), and an auxiliary storage device such as an erasable programmable read-only memory (EPROM), a disk drive, or a removable media. However, some or all of the functions may be implemented by a hardware circuit such as an ASIC or an FPGA.

In the present embodiment, the microcomputer 11 includes a control unit 111 and a storage unit 112. The control unit 111 is a calculation unit (such as a CPU) that realizes various functions of the DCM 10 by executing a predetermined program.

The storage unit 112 is a memory device including a main storage unit and an auxiliary storage device. An operating system (OS), various programs, various tables, and the like are stored in the auxiliary storage device. The programs stored in the auxiliary storage device are loaded into the work area of the main storage device and executed, and through this execution, various functions can be implemented that match the predetermined purpose, which will be described later.

The microcomputer 11 included in the DCM 10 has a function of mediating communication between the external network and the vehicle 1. For example, when the ECU of the vehicle 1 requires communication with the external network, the DCM 10 relays the data transmitted from the ECU to the external network. In addition, the DCM 10 receives the data transmitted from the external network and transfers the data to an appropriate ECU.

In the present embodiment, the microcomputer 11 receives a command for operating the air conditioning of the vehicle 1 (hereinafter referred to as an air conditioning command) from the center server 100, and executes a process of transferring the air conditioning command to the air conditioning ECU 20 that will be described later.

In addition, the DCM 10 can execute functions specific to its own device. For example, the DCM 10 has a security system monitoring function and a call function, and can make a security call, an emergency call, or the like based on a trigger generated in the vehicle.

The communication unit 12A is a communication interface that connects the DCM 10 to the in-vehicle network (CAN bus 40). The communication unit 12A executes a process of converting a message in a predetermined format generated by the microcomputer 11 into CAN data and a process of converting the received CAN data into a message in a predetermined format and transmitting the message to the microcomputer 11.

The communication unit 12B is a communication interface that connects the DCM 10 to the external network. The communication unit 12B executes a process of converting a message in a predetermined format generated by the microcomputer 11 into a communication packet and a process of converting the received communication packet into a message in a predetermined format and transmitting the message to the microcomputer 11.

Next, the air conditioning ECU 20 will be described.

The air conditioning ECU 20 is an electronic control unit that controls the air conditioning of the vehicle 1. A plurality of air conditioning devices (heating devices) are connected to the air conditioning ECU 20, and the heating devices can be controlled based on a command from the user. Examples of the plurality of heating devices provided in the vehicle 1 include a heat pump type car air conditioner, a defogger (defroster), a seat heater, and a steering wheel heater.

The air conditioning ECU 20 can operate the heating device based on both the operation performed on a control panel installed in the vehicle and the air conditioning command transmitted from the external network.

Further, the air conditioning ECU 20 has functions of acquiring information on the remaining amount of a driving battery (hybrid battery) of an own vehicle from the charging ECU 30 described later, and selecting a heating device that can be operated in accordance with the remaining amount of the battery.

The air conditioning ECU 20 includes a microcomputer 21 and a communication unit 22 that is an interface communicating with the CAN bus 40.

That is, similar to the microcomputer 11, the microcomputer 21 can be configured as a microcomputer provided with a processor such as a CPU or a GPU, a main storage device such as a RAM or a ROM, an auxiliary storage device such as an EPROM, a hard disk drive, or a removable medium.

In the present embodiment, the microcomputer 21 includes a control unit 211 and a storage unit 212. The control unit 211 is a calculation unit (such as a CPU) that realizes various functions of the air conditioning ECU 20 by executing a predetermined program.

The storage unit 212 is a memory device including a main storage unit and an auxiliary storage device. The functions are the same as those of the control unit 111 and the storage unit 112. Therefore, detailed description thereof will be omitted.

The microcomputer 21 included in the air conditioning ECU 20 receives an air conditioning command for operating air conditioning of the vehicle 1 from the external network, and operates the plurality of heating devices based on the air conditioning command.

Figure 3:
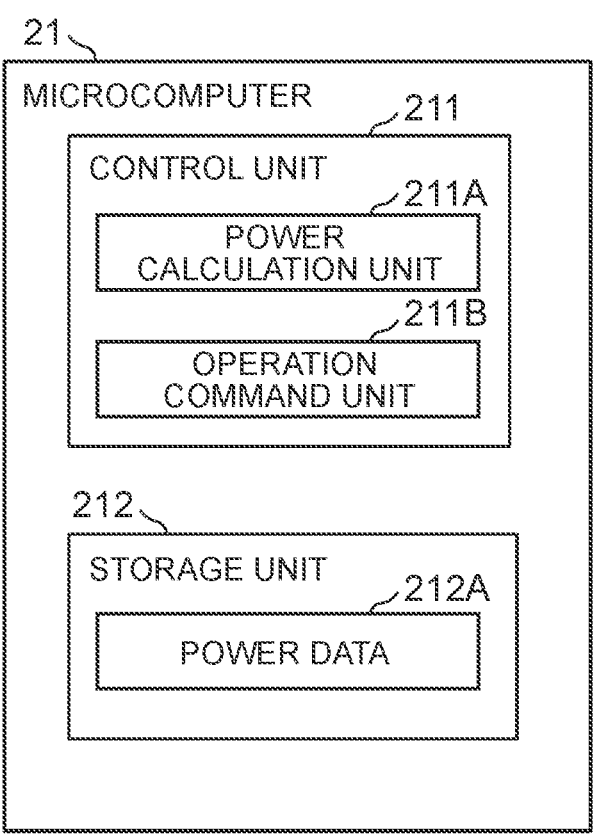
FIG. 3 is a block diagram showing a module configuration of a microcomputer included in an air conditioning ECU.

The configuration of the microcomputer 21 will be described in more detail. FIG. 3 is a diagram showing a logical configuration of the control unit 211 and the storage unit 212.

The control unit 211 has a power calculation unit 211A and an operation command unit 211B as functional modules. Each functional module may be implemented by having the control unit 211 (that is, a CPU, etc.) execute a program that is stored in storage means such as a ROM.

The storage unit 212 stores power data 212A.

The functional module included in the control unit 211 will be described.

The power calculation unit 211A calculates the power consumption amount required until the operation is completed, for one or more heating devices in which the operation is requested by the air conditioning command.

The operation command unit 211B generates a command for operating one or more heating devices in which the operation is requested by the air conditioning command. Further, based on the power consumption amount acquired by the calculation and the remaining amount of the driving battery acquired via the charging ECU 30 described later, the operation command unit 211B determines that the heating device to be operated needs to be limited, and selects the heating device to be actually operated.

The power data 212A is data relating to the power consumed by the heating device provided in the vehicle 1. Details of the power data 212A will be described later.

The communication unit 22 is a communication interface that connects the air conditioning ECU 20 to the in-vehicle network (CAN bus 40). The communication unit 22 executes a process of converting a message in a predetermined format generated by the microcomputer 21 into CAN data and a process of converting the received CAN data into a message in a predetermined format and transmitting the message to the microcomputer 21.

The charging ECU 30 is an electronic control unit that controls charging and discharging of the driving battery (hybrid battery) of the vehicle 1. The charging ECU 30 can provide the air conditioning ECU 20 with information regarding the remaining amount of the hybrid battery.

The CAN bus 40 is a communication bus that constitutes the in-vehicle network based on the CAN protocol. In the present embodiment, one CAN bus 40 is exemplified. However, the in-vehicle network may include a plurality of communication buses. Further, the in-vehicle network may include a gateway that connects the communication buses to each other.

Next, the center server 100 and the user terminal 200 will be described.

FIG. 4 is a block diagram schematically showing an example of the configurations of the center server 100 and the user terminal 200 shown in FIG. 1.

The center server 100 is a server device that manages a plurality of the vehicles 1. The center server 100 can transmit and receive data to and from the vehicles 1 by wireless communication. In the present embodiment, the center server 100 commands the vehicle 1 to operate the remote air conditioning based on the air conditioning request transmitted from the user terminal 200.

The user terminal 200 is a mobile terminal owned by the user of the vehicle 1. The user terminal 200 is configured to be able to execute the application program for executing the remote air conditioning of the vehicle. The application program outputs a user interface for setting an air conditioning parameter and acquires the content of the input made by the user. Further, based on the content of the input, the application program generates the air conditioning request for operating the air conditioning of the vehicle 1 and transmits the request to the center server 100.

The center server 100 and the user terminal 200 can be configured by a general-purpose computer. That is, the center server 100 and the user terminal 200 can be configured as a computer having a processor such as a CPU or a GPU, a main storage device such as a RAM or a ROM, an auxiliary storage device such as an EPROM, a hard disk drive, or a removable medium. An operating system (OS), various programs, various tables, and the like are stored in the auxiliary storage device. The programs stored in the auxiliary storage device are executed such that various functions can be implemented that match the predetermined purpose, which will be described later. However, some or all of the functions may be implemented by a hardware circuit such as an ASIC or an FPGA.

First, the center server 100 will be described. The center server 100 is configured to include a control unit 101, a storage unit 102, and a communication unit 103.

The control unit 101 is means for controlling the center server 100. The control unit 101 is composed of, for example, an information processing unit such as a CPU or a GPU.

The control unit 101 includes a vehicle management unit 1011 and an air conditioning control unit 1012 as functional modules. Each functional module may be implemented by having a CPU execute a program that is stored in storage means such as a ROM.

The vehicle management unit 1011 periodically communicates with the DCM 10 of the vehicle 1 under control and collects data related to the vehicle (hereinafter referred to as vehicle data). The vehicle data includes, for example, vehicle position information, vehicle speed information, information related to driving operations, and communication status. Further, the vehicle management unit 1011 has a definition of a communication protocol with the vehicle 1.

The air conditioning control unit 1012 identifies the vehicle (target vehicle) in which remote air conditioning is performed based on the air conditioning request received from the user terminal 200, and transmits the air conditioning command to the DCM 10 mounted on the specified target vehicle via the network.

The storage unit 102 is means for storing information, and is composed of a storage medium such as a RAM, a magnetic disk, or a flash memory. The storage unit 102 stores various programs executed by the control unit 101, data used by the programs, and the like. Further, the storage unit 102 stores data related to the vehicle 1 (an identifier of the vehicle 1, identification information of the DCM 10, etc.).

The communication unit 103 is an interface for connecting the center server 100 to the network. The communication unit 103 can communicate with the vehicle 1 and the user terminal 200 via, for example, the Internet or a mobile communication network.

Next, the user terminal 200 will be described. The user terminal 200 includes a control unit 201, a storage unit 202, a communication unit 203, and an input and output unit 204.

The control unit 201 is means for controlling the user terminal 200. The control unit 101 is composed of, for example, an information processing unit such as a CPU or a GPU.

The control unit 201 includes an air conditioning request unit 2011 as a functional module. Each functional module may be implemented by a program that is stored in storage means such as a ROM and executed by the CPU.

The air conditioning request unit 2011 generates a request for operating the air conditioning of the vehicle 1 (air conditioning request) based on the operation performed by the user, and transmits the request to the center server 100. The air conditioning request unit 2011 is realized by the above-mentioned application program. The air conditioning request unit 2011 generates a user interface screen and provides it to the user. Further, the air conditioning request unit 2011 acquires the information input via the user interface screen, and generates the air conditioning request based on the information.

The storage unit 202 is means for storing information, and is composed of a storage medium such as a RAM, a magnetic disk, or a flash memory. The storage unit 202 stores various programs executed by the control unit 201, data used by the programs, and the like.

The communication unit 203 is an interface for connecting the user terminal 200 to a network (for example, the Internet and a mobile communication network). The communication unit 203 can communicate with the center server 100 using the same means as the communication unit 103.

The input and output unit 204 is means for receiving the input operation performed by the user and presenting information to the user. Specifically, the input and output unit 204 is composed of a touch panel and its control means, and a liquid crystal display and its control means. The touch panel and the liquid crystal display are composed of one touch panel display in the present embodiment. Further, the input and output unit 204 may have a speaker or the like for outputting audio.

Next, the details of the air conditioning parameter generated by the user terminal 200 and the user interface for generating the air conditioning parameter will be described.

It is necessary to specify an air conditioning mode, a temperature (target room temperature), operating time, a heating device to be operated, and the like so as to operate the air conditioning of the vehicle. The information is called the air conditioning parameter.

FIG. 5 is an example of the air conditioning parameter transmitted from the user terminal 200 to the center server 100. The air conditioning parameter includes a vehicle identifier, the air conditioning mode, temperature settings, a timer, information specifying the heating device to operate, and the like.

The center server 100 generates a control command (air conditioning command) for the air conditioning ECU 20 of the vehicle 1 based on the received air conditioning parameter.

Figure 6:
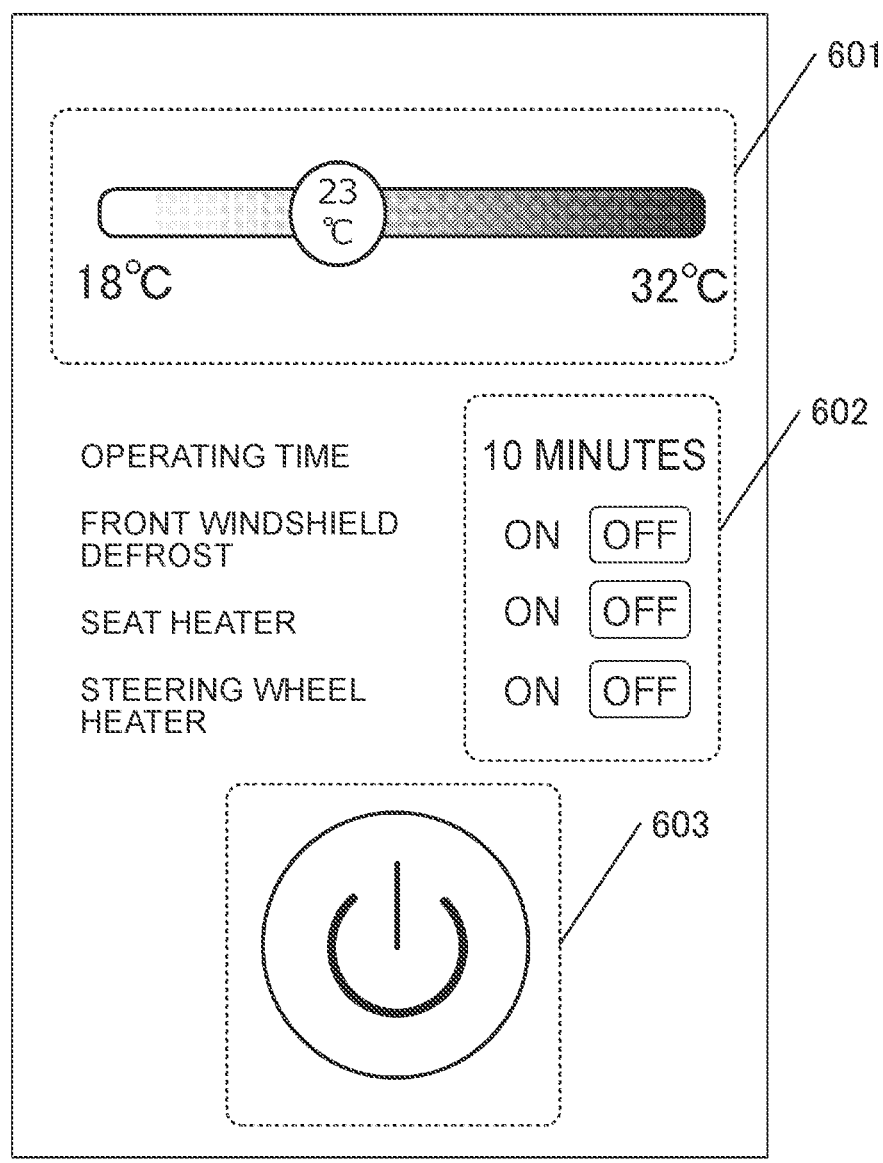
FIG. 6 is an example of a user interface provided by the user terminal.

FIG. 6 is an example of the user interface for specifying the illustrated air conditioning parameter. The illustrated user interface is configured to include a slider for setting the temperature (reference sign 601), a component for specifying the operating time of a heating device and a heating device to be operated (reference sign 602), a button for transmitting a request (reference sign 603), and the like.

Next, the relationship between the remaining battery amount and the availability of remote air conditioning will be described.

Figure 7A:
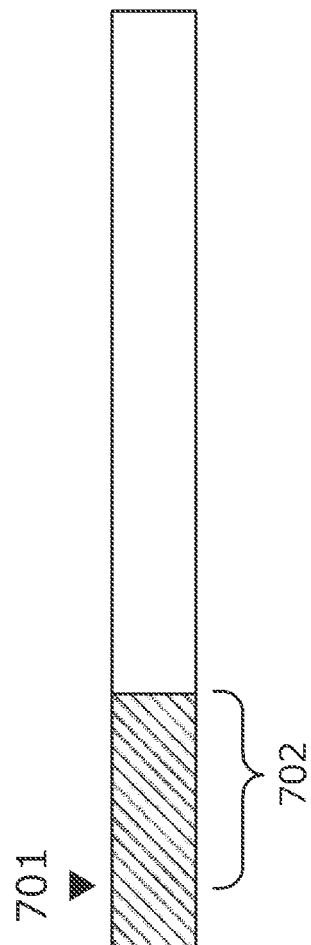
FIG. 7A is a diagram illustrating a remaining battery amount of a vehicle.

FIG. 7A is a diagram showing the remaining amount of the hybrid battery of the vehicle 1. Here, when it is assumed that the remaining battery amount after the remote air conditioning operation is lower than a threshold value indicated by reference sign 701, the control for prohibiting the remote air conditioning intervenes. That is, the amount of power that can be used for remote air conditioning is the amount indicated by reference sign 702.

Figure 7B:
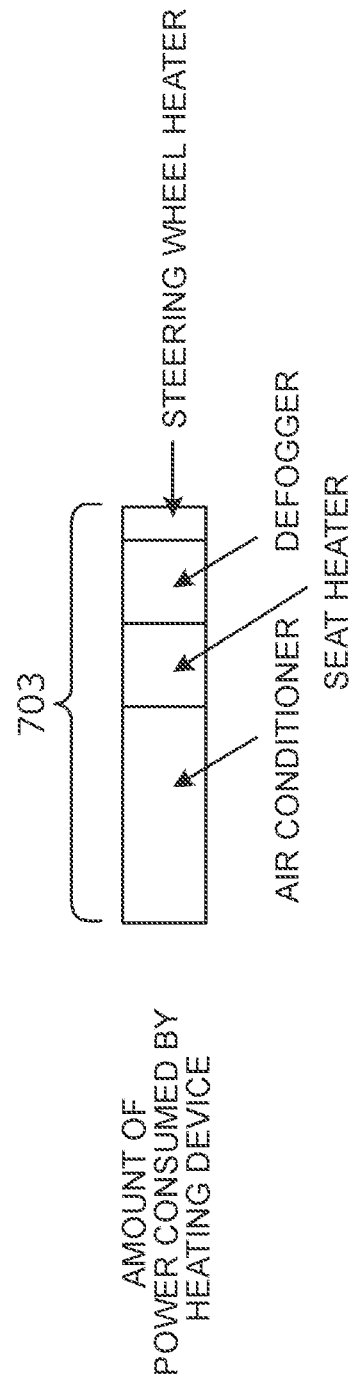
FIG. 7B is a diagram illustrating the remaining battery amount of the vehicle.

FIG. 7B is a diagram showing the amount of power consumed by the heating device in which the operation is specified by the user. In the illustrated example, four types of operations of an air conditioner, a seat heater, a defogger, and a steering wheel heater are specified. When all of these devices are operated, the amount of power used in the remote air conditioning is the amount indicated by reference sign 703.

In the illustrated example, the amount of power used in the remote air conditioning (reference sign 703) exceeds the amount of power that can be used for the remote air conditioning (reference sign 702). Thus, the remote air conditioning itself cannot be executed.

In such a situation, the air conditioning ECU 20 according to the present embodiment generates a combination of heating devices capable of being operated. Specifically, the air conditioning ECU 20 generates a combination of heating devices capable of keeping the power consumption amount within the threshold value, and operates the heating device in accordance with the generated combination. For example, in the examples of FIGS. 7A and 7B, if there are two types heating devices that are the seat heater and defogger, the power consumption amount can be kept within the threshold value. Thus, the air conditioning ECU 20 operates only two types of heating devices that are the seat heater and the defogger.

How much power each of the plurality of heating devices consumes can be calculated based on the power consumption and operating time of each heating device.

In the present embodiment, the microcomputer 21 stores, as the power data 212A, data indicating the transition of power consumption when a plurality of heating devices is consecutively operated.

FIGS. 8A and 8B are examples of data showing changes in power consumption when a plurality of heating devices is consecutively operated.

For example, FIG. 8A is a graph showing the transition of the power consumption of a heating device (for example, a seat heater, a steering wheel heater, etc.) having a constant output. Further, FIG. 8B is a graph showing the transition of the power consumption of a heating device (for example, a car air conditioner) in which the output is not constant depending on the temperature condition. In this example, different power consumption curves are defined in accordance with the difference between the current temperature and the target temperature.

In the present embodiment, the microcomputer 21 stores such data as the power data 212A and uses it for calculating the power consumption amount. For example, when it is specified that remote air conditioning is performed for 10 minutes, the power consumption amount when each heating device is operated for 10 minutes is calculated. In addition, when it is specified that remote air conditioning is performed until the target temperature is reached, the time until each heating device satisfies the condition (target temperature) is calculated, and the power consumption amount when each heating device is operated for that time is calculated. The microcomputer 21 may store data for calculating the time required for each heating device to achieve the target temperature (for example, data related to heating capacity).

In the example of FIG. 8B, the transition of power consumption is defined by using the elapsed time and the relative temperature (difference between the current temperature and the target temperature). However, the transition of power consumption may be defined by further using other information. For example, the heating capacity of a heat pump type air conditioner may vary depending on the temperature outside the vehicle. Therefore, the transition of power consumption may be defined by using the elapsed time, the temperature outside the vehicle at the start of air conditioning, the temperature inside the vehicle at the start of air conditioning, the target temperature, or a combination thereof.

By the method described above, the air conditioning ECU 20 can calculate the total amount of power consumed when remote air conditioning is performed in accordance with the specified air conditioning parameters.

Here, when the calculated power consumption exceeds the consumable power amount, the air conditioning ECU 20 generates a combination of heating devices such that the power consumption amount is lower than the threshold value.

When there is a plurality of combinations, the combination to be adopted may be determined based on a priority predetermined for each heating device. For example, the operation may be prioritized in the order of the defogger, the air conditioner, the seat heater, and the steering wheel heater. This priority may be predetermined by the user.

FIG. 9 is a flowchart showing the flow of data between components included in the system.

When the user who desires remote air conditioning of the vehicle activates application software on the user terminal 200, the user terminal 200 (air conditioning request unit 2011) generates the user interface and provides the interface to the user (step S11).

In step S12, the air conditioning request unit 2011 acquires the air conditioning parameter specified by the user via the generated user interface, and transmits the air conditioning request including the air conditioning parameter to the center server 100.

In step S13, the center server 100 (air conditioning control unit 1012) receives the air conditioning request and generates the air conditioning command to be transmitted to the target vehicle. The format and transmission destination of the air conditioning command can be determined based on the data managed by the vehicle management unit 1011. The generated air conditioning command is transmitted to the DCMZ 10 provided in the target vehicle via the network.

In step S14, the DCM 10 provided in the target vehicle receives the air conditioning command and starts the remote air conditioning based on the air conditioning command. Specifically, the microcomputer 11 provided in the DCM 10 transfers the received air conditioning command to the air conditioning ECU 20, and the microcomputer 21 provided in the air conditioning ECU 20 operates various heating devices in accordance with the air conditioning command.

At this time, the air conditioning ECU 20 (microcomputer 21) selects a heating device to be operated as necessary.

Figure 10:
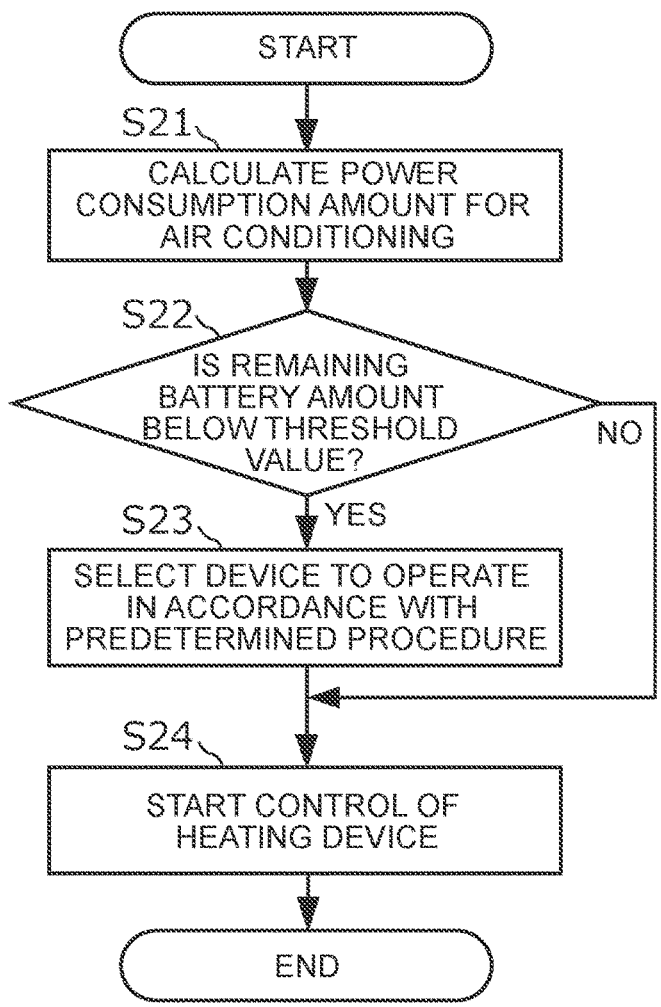
FIG. 10 is a flowchart of process executed by the air conditioning ECU.

This process will be described in more detail. FIG. 10 is a flowchart of the process executed by the air conditioning ECU 20 that has received the air conditioning command in step S14.

First, in step S21, by the method described above, the power calculation unit 211A calculates the amount of power required until the operation is completed for one or more heating devices for which the operation is requested.

Next, in step S22, the operation command unit 211B determines whether the remaining amount of the hybrid battery after the electric energy acquired by the calculation is consumed is below a predetermined threshold value. When an affirmative determination is made, the process proceeds to step S23. When a negative determination is made, the process ends.

In step S23, the operation command unit 211B selects a heating device to be operated following a predetermined procedure. Specifically, a combination of heating devices in which the power consumption amount is below the threshold value is generated. When there is a plurality of combinations, the combination to be adopted may be determined based on a priority predetermined for each heating device.

Then, in step S24, the operation command unit 211B starts controlling the selected heating device. As a result, the selected heating device operates in accordance with the specified parameters (the temperature, the mode, the operating time, etc.). The air conditioning ECU 20 may stop the operation of the heating device when the specified conditions (for example, the room temperature, the operating time, etc.) are satisfied.

The air conditioning ECU 20 may generate data (answerback data) notifying that the operation of the heating device has started and transmit the data to the center server 100. The answerback data is transmitted to the center server 100 via the DCM 10. Further, the center server 100 may transfer the answerback data to the user terminal 200. As a result, it is possible to notify the user of the vehicle that the remote air conditioning has operated normally.

Further, if it is not possible to operate all of the heating devices for which the operation is requested, the air conditioning ECU 20 may include a notification to that effect in the answerback data. This makes it possible, for example, to inform the user that there is a heating device that cannot be operated.

As described above, in the vehicle system according to the present disclosure, among the heating devices in which the operation is specified by the user, the heating device to be actually operated is selected based on the remaining battery amount of the vehicle. In particular, since a plurality of heating devices is selected within the range of the amount of power that can be used, remote air conditioning can be performed even in an environment where remote air conditioning could not be performed in the past.

Second Embodiment

In the first embodiment, the air conditioning ECU provided in the vehicle selects a heating device to be actually operated. In contrast, the second embodiment is an embodiment in which the process is executed in the center server 100.

In the second embodiment, the microcomputer 21 included in the air conditioning ECU 20 does not have a function of selecting a heating device. Further, it does not have a function of managing the power data 212A. That is, the microcomputer 21 included in the air conditioning ECU 20 only executes the control for operating the heating device by following the received air conditioning command.

Instead, in the second embodiment, the control unit 101 included in the center server 100 manages the remaining battery amount of the plurality of vehicles and the power data corresponding to the plurality of vehicles. In addition, when an air conditioning request is received, a heating device that is actually operated is selected.

Figure 11:
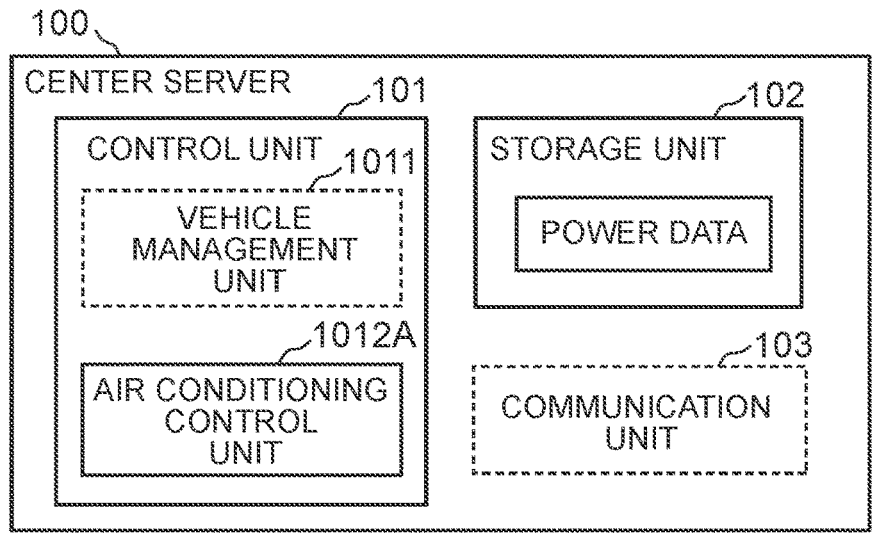
FIG. 11 is a configuration diagram of a center server according to a second embodiment.

FIG. 11 is a diagram illustrating the configuration of the center server 100 in the second embodiment. As shown in the figure, the control unit 101 included in the center server 100 has an air conditioning control unit 1012A. The air conditioning control unit 1012A is different from the air conditioning control unit 1012 in the first embodiment since it has an added function of managing the remaining battery amount of the plurality of vehicles 1 and selecting a heating device allowed to be operated, based on the air conditioning request received from the user terminal 200. Further, the air conditioning control unit 1012A generates an air conditioning command for operating the selected heating device.

Data indicating the remaining battery amount of the vehicle 1 may be included in the vehicle data collected by the vehicle management unit 1011. As a result, the center server 100 can grasp the remaining battery amount of the plurality of vehicles 1.

Figure 12:
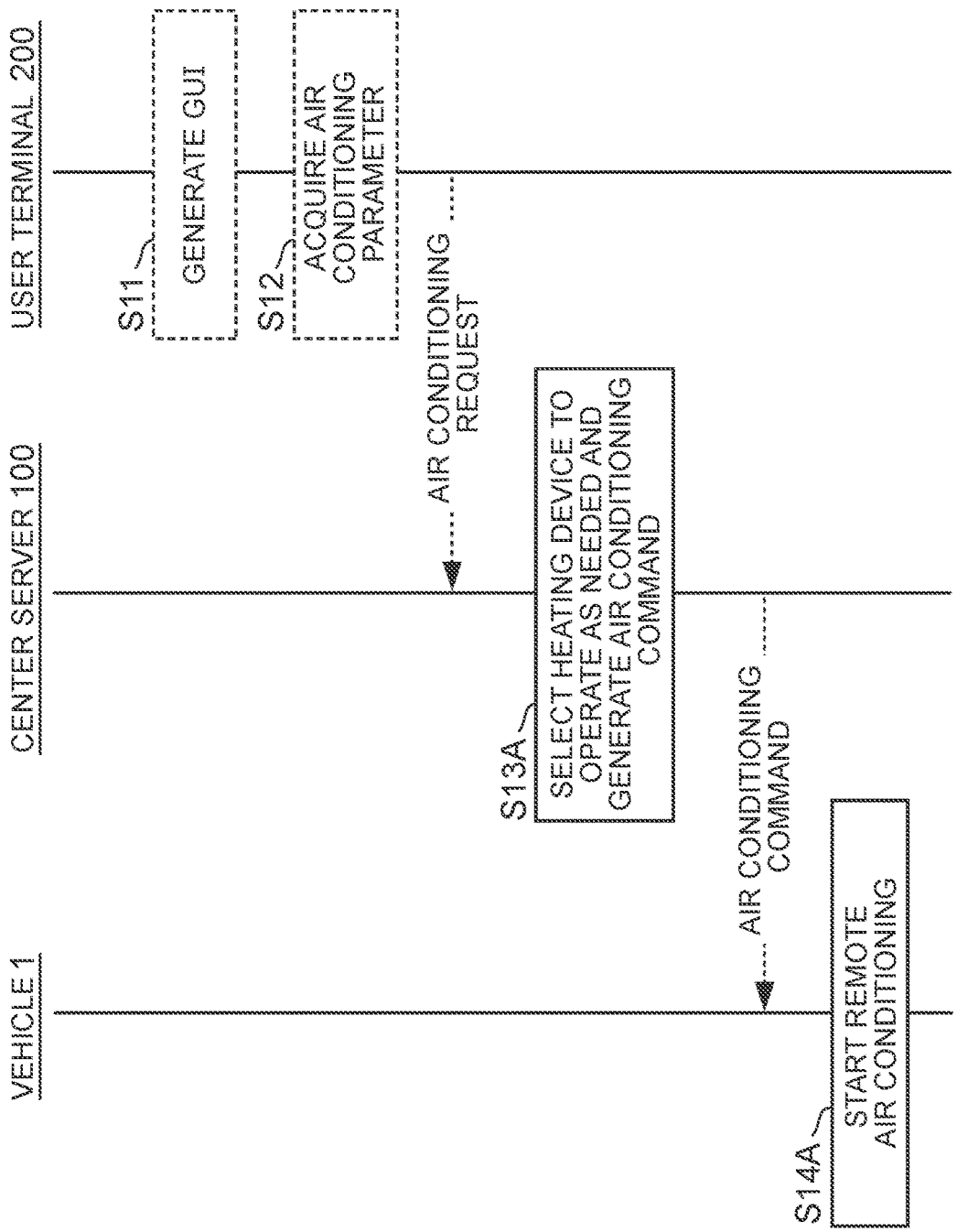
FIG. 12 is a flow chart of data transmitted and received in the second embodiment.

FIG. 12 is a flow chart showing a flow of data transmitted and received between each component in the second embodiment. The same process as that of the first embodiment is shown by a dotted line, and the description thereof will be omitted.

In step S13A, the air conditioning control unit 1012A generates an air conditioning command after selecting a heating device to be operated by the method described above, based on the remaining battery amount of the target vehicle to be remotely air-conditioned and the content of the air conditioning request. In this step, an air conditioning command to operate the unselected heating device is not generated.

In step S14A, the air conditioning ECU 20 operates the heating device in accordance with the received air conditioning command.

As described above, the center server 100 can also select the heating device to be operated.

When executing the process of step S11, the center server 100 may communicate with the user terminal 200 and provide the user terminal 200 with information on the current remaining battery amount of the target vehicle or the operable heating device in advance. According to such a form, the user of the vehicle can recognize in advance that the operation of the heating device is restricted.

Modification

The above-described embodiment is merely an example, and the present disclosure may be appropriately modified and implemented without departing from the scope thereof.

For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EE-PROM), a magnetic card, a flash memory, an optical card, and any type of medium suitable for storing electronic commands.

What is claimed is:

1. An information processing device that controls a vehicle including a plurality of heating devices, the information processing device comprising:
    a storage unit that stores first data related to power consumption for each of the plurality of heating devices and second data related to heating capacity for each of the plurality of heating devices included in the vehicle; and
    a processor that executes acquiring an air conditioning request transmitted from a user terminal, wherein the air conditioning request includes designating a condition for ending an operation of the heating device,
    wherein the processor calculates a time until each of the plurality of heating devices in which operations are specified by the air conditioning request satisfies the condition using the second data,
    wherein the processor calculates a power consumption amount when each of the plurality of heating devices in which operations are specified by the air conditioning request is operated for the time using the first data,
    wherein the processor determines whether a remaining battery amount of the vehicle after a total amount of the calculated power consumption amount is consumed is below a predetermined threshold value,
    wherein the processor selects a heating device to be operated among the plurality of heating devices in which operations are specified by the air conditioning request when the processor determines that the remaining battery amount is below the predetermined threshold value,
    wherein the processor selects the heating device to be operated based on the remaining battery amount of the vehicle and the calculated power consumption amount such that the remaining battery amount after the operation of the heating device is ended does not fall below the predetermined threshold value, and
    wherein, after the processor selects the heating device to be operated, the processor starts a control of the operation of the heating device that was selected.

2. The information processing device according to claim 1, wherein the storage unit stores data related to a transition of power consumption when each of the plurality of heating devices is consecutively operated.

3. The information processing device according to claim 1, wherein the storage unit stores data related to a transition of power consumption when each of the plurality of heating devices is consecutively operated under a predetermined temperature condition.

4. The information processing device according to claim 1, wherein the processor makes the selection based on a priority set for each of the plurality of heating devices.

5. The information processing device according to claim 1, wherein the processor notifies a user when an operation of at least one of the plurality of heating devices in which the operations are specified is restricted as a result of the selection.

6. An information processing method that controls a vehicle including a plurality of heating devices, the information processing method comprising:
    a step of storing first data related to power consumption for each of the plurality of heating devices and second data related to heating capacity for each of the plurality of heating devices included in the vehicle;
    a step of acquiring an air conditioning request transmitted from a user terminal,
    wherein the air conditioning request includes designating a condition for ending an operation of the heating device;
    a step of calculating a power consumption amount when each of the plurality of heating devices in which operations are specified by the air conditioning request is operated for the time using the first data;
    a step of determining whether a remaining battery amount of the vehicle after a total amount of the calculated power consumption amount is consumed is below a predetermined threshold value;
    a step of selecting a heating device to be operated among the plurality of heating devices in which operations are specified by the air conditioning request when the processor determines that the remaining battery amount is below the predetermined threshold value;
    a step of selecting the heating device to be operated based on the remaining battery amount of the vehicle and the calculated power consumption amount such that the remaining battery amount after the operation of the heating device is ended does not fall below the predetermined threshold value; and
    after the step of selecting the heating device to be operated, a step of starting a control of the operation of the heating device that was selected.

7. The information processing method according to claim 6, wherein data related to a transition of power consumption when each of the plurality of heating devices is consecutively operated is acquired.

8. The information processing method according to claim 6, wherein data related to a transition of power consumption when each of the plurality of heating devices is consecutively operated under a predetermined temperature condition is acquired.

9. The information processing method according to claim 6, wherein the selection is made based on a priority set for each of the plurality of heating devices.

10. The information processing method according to claim 6, wherein a user is notified when an operation of at least one of the plurality of heating devices in which the operations are specified is restricted as a result of the selection.

11. A non-transitory storage medium storing instructions that are executable by one or more processors and that cause the one or more processors to perform functions comprising:
    a step of storing first data related to power consumption for each of the plurality of heating devices and second data related to heating capacity for each of the plurality of heating devices included in the vehicle;

a step of acquiring an air conditioning request transmitted from a user terminal, wherein the air conditioning request includes designating a condition for ending an operation of the heating device;

a step of calculating a power consumption amount when each of the plurality of heating devices in which operations are specified by the air conditioning request is operated for the time using the first data;

a step of determining whether a remaining battery amount of the vehicle after a total amount of the calculated power consumption amount is consumed is below a predetermined threshold value;

a step of selecting a heating device to be operated among the plurality of heating devices in which operations are specified by the air conditioning request when the processor determines that the remaining battery amount is below the predetermined threshold value;

a step of selecting the heating device to be operated based on the remaining battery amount of the vehicle and the calculated power consumption amount such that the remaining battery amount after the operation of the heating device is ended does not fall below the predetermined threshold value; and after the step of selecting the heating device to be operated, a step of starting a control of the operation of the heating device that was selected.

12. A vehicle comprising:
a plurality of heating devices;
a driving battery;
a storage unit that stores first data related to power consumption for each of the plurality of heating devices and second data related to heating capacity for each of the plurality of heating devices included in the vehicle; and
a processor that calculates a time until each of the plurality of heating devices in which operations are specified by an air conditioning request satisfies a condition using the second data, wherein the processor calculates a power consumption amount when each of the plurality of heating devices in which operations are specified by the air conditioning request is operated for the time using the first data, wherein the processor determines whether a remaining battery amount of the vehicle after a total amount of the calculated power consumption amount is consumed is below a predetermined threshold value, wherein that the processor selects a heating device to be operated among the plurality of heating devices in which operations are specified by the air conditioning request transmitted from a user terminal when the processor determines that the remaining battery amount is below the predetermined threshold value, wherein the processor selects the heating device based on the remaining battery amount of the vehicle and the calculated power consumption amount, wherein the processor selects the heating device to be operated such that the remaining battery amount after the operation of the heating device is ended does not fall below the predetermined threshold value, and wherein, after the processor selects the heating device to be operated, the processor starts a control of the operation of the heating device that was selected.

* * * * *